Sept. 29, 1970             H. M. RIVERS             3,531,252

METHODS OF ANALYZING CONDUCTIVE SOLUTIONS

Filed Oct. 17, 1966             3 Sheets-Sheet 1

INVENTOR
Hubert M. Rivers

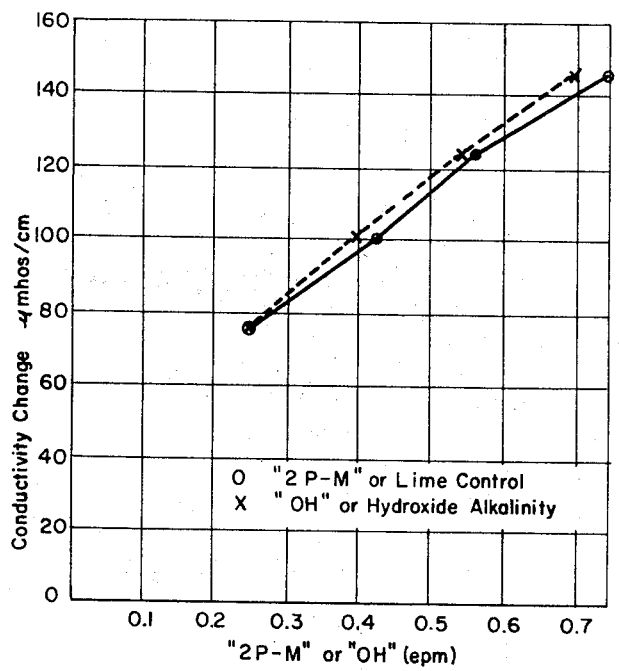
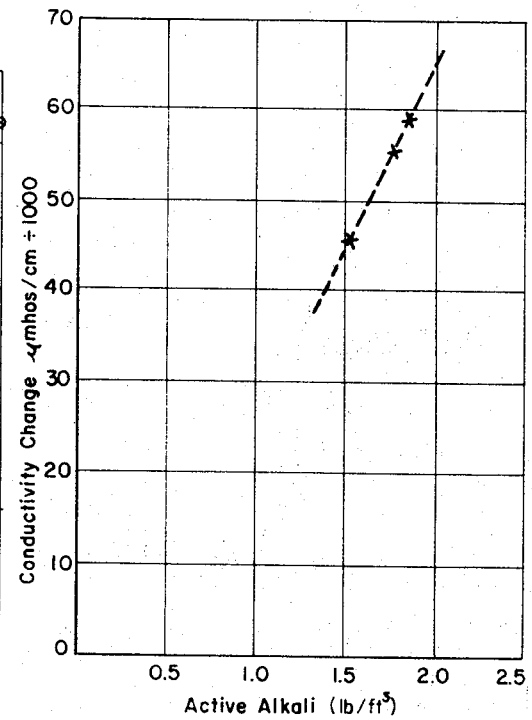
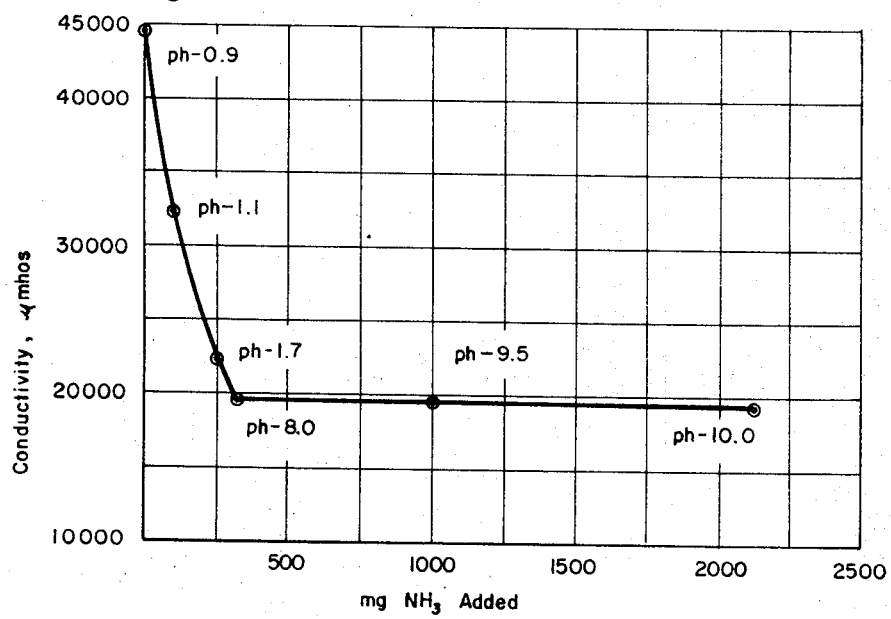

INVENTOR
Hubert M. Rivers

United States Patent Office 3,531,252
Patented Sept. 29, 1970

3,531,252
METHODS OF ANALYZING CONDUCTIVE SOLUTIONS
Hubert M. Rivers, Upper St. Clair Township, Allegheny County, Pa., assignor, by mesne assignments, to Calgon Corporation, a corporation of Delaware
Filed Oct. 17, 1966, Ser. No. 587,312
Int. Cl. F22b 37/54; G01n 27/10
U.S. Cl. 23—230
6 Claims

ABSTRACT OF THE DISCLOSURE

Method and apparatus for determining the amount of ionized constituents in solution by the steps of measuring the conductivity of the solution, adding a reaction reagent such that a substantial excess beyond the point of neutralization will not affect the conductivity of the solution and capable of reacting with said constituent in an amount in excess of that necessary for reaction, measuring the conductivity of the solution following the addition of reagent, measuring the difference between the two conductivities and determining the amount of constituent present from a curve of differential conductivity versus concentration prepared from known concentrations of the same constituent reacted with the same reagent.

---

This invention relates to analyzers and methods of analyzing conductive solutions and particularly to differential conductivity analyzers and methods.

Conductivity is recognized in the art to which this invention pertains as the ability of a medium, in practice usually in aqueous medium, containing dissolved ionized solids, to conduct an electric current. Conductivity of water changes with varying content of ionized solids. This factor has been utilized in the past as a means of controlling many industrial processes such as for example, for regulating the withdrawal of blowdown water from steam-generating boilers and for generating a chemical feeder control signal based on conductivity of the solution into which chemicals are to be fed.

I have discovered a method of measuring the amount of certain constituents in liquid streams capable of producing a conductivity measurement. I have found that the amount of ionized constituent in a liquid stream may be accurately determined by measuring the conductivity of the liquid stream, adding a buffering type reagent capable of reacting with the ionized constituent in the stream, measuring the conductivity of the reacted stream, determining the difference in conductivity between the original stream and the reacted stream and determining the amount of constituent present from a curve of differential conductivity versus concentration prepared from known concentrations of the same constituent. The differential conductivity reading may be used to control the feed of constituent into the solution. The apparatus comprises means for measuring conductivity of a solution, means for adding a buffering reagent to said solution, means for measuring conductivity of the solution after the addition of buffering reagent and means for determining the difference between the two conductivities to provide a differential conductivity measurement.

Figure 1:
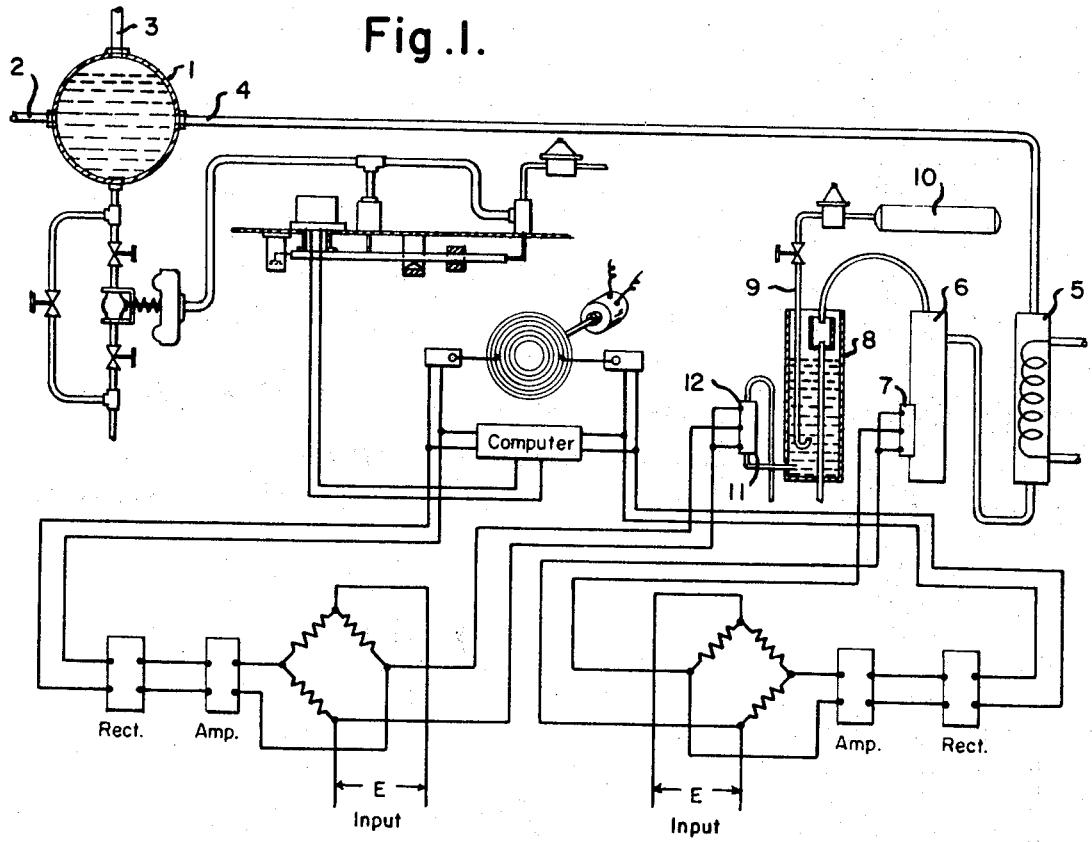
Figure 7:
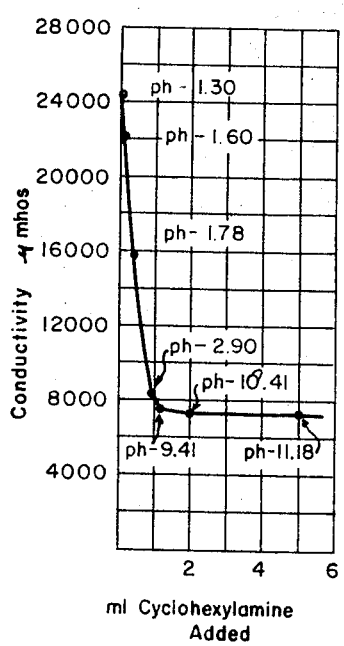
Figure 8:
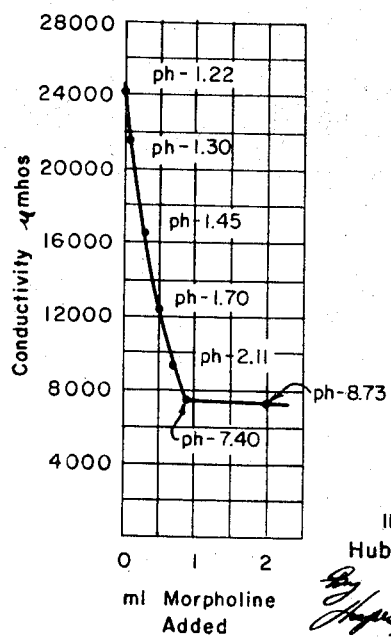
Figure 5:
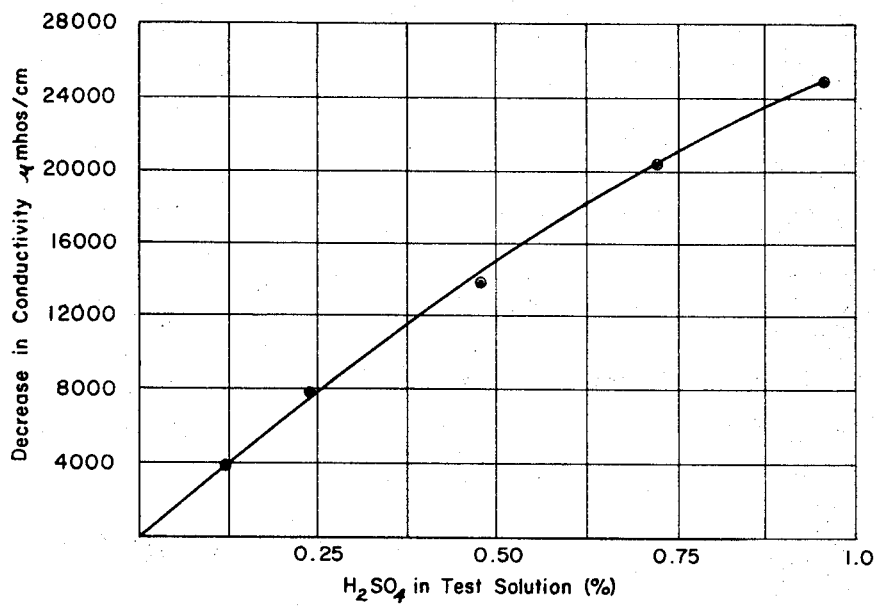
Figure 6:
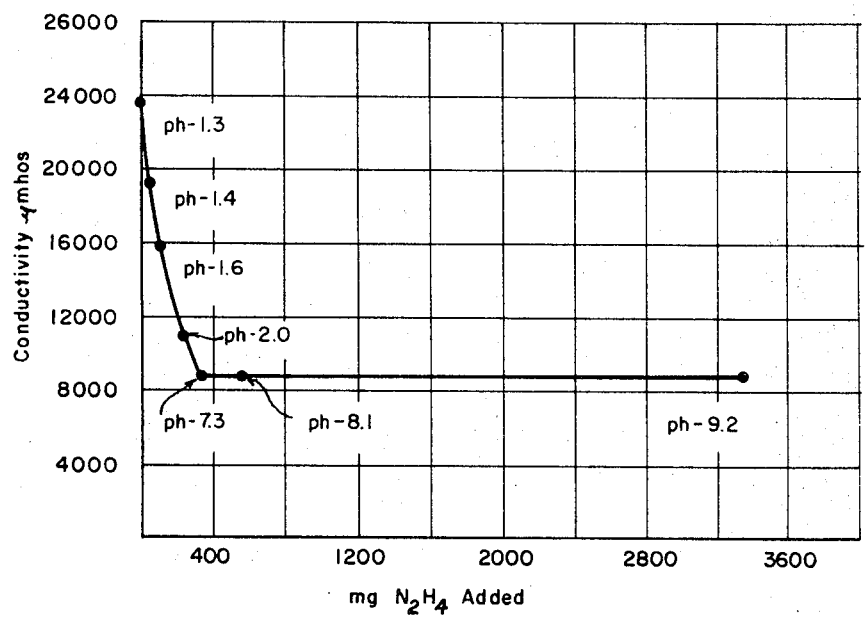

The nature of this invention can perhaps best be understood by referring to the following examples of preferred practices of my invention and to the following figures in which:

FIG. 1 is a diagrammatic view of an apparatus for use in steam boiler systems;
FIG. 2 is a graph of relationship of differential conductivity versus alkalinity control criteria as employed in lime-soda softening of water;
FIG. 3 is a graph of differential conductivity versus active alkali in samples of cooking liquor from a sulfate process, continuous, up-flow digester;
FIG. 4 is a graph illustrating the occurrence of a substantially stable conductimetric endpoint when sulfuric acid is neutralized with an excess of ammonia;
FIG. 5 is a graph of sulfuric acid concentration and differential conductivity resulting from neutralization with ammonia;
FIG. 6 is a graph illustrating the occurrence of a substantially stable conductimetric endpoint when sulfuric acid is neutralized with an excess of hydrazine;
FIG. 7 is a graph illustrating the occurrence of a substantially stable conductimetric endpoint when sulfuric acid is neutralized with an excess of cyclohexylamine; and
FIG. 8 is a graph illustrating the occurrence of a substantially stable conductimetric endpoint when sulfuric acid is neutralized with an excess of morpholine.

EXAMPLE I

It is a problem in boiler water treatment to obtain a reasonably correct value for the concentration of treating chemicals in the boiler. Hydroxyl ion and specifically sodium hydroxide is a common constituent of boiler water, generally needing to be controlled specifically by preboiler or internal boiler treatment methods. By my invention, the presence of hydroxide alkalinity can be readily and precisely determined by measuring the conductivity of the boiler water, passing the water through a chamber where $CO_2$ is introduced to neutralize the alkalinity of the water, and then again measuring the conductivity of the water and computing the difference between the two conductivities to produce a value for differential conductivity. I have found that differential conductivity versus boiler water alkalinity concentration is substantially a straight line function. In FIG. 1, I have illustrated diagrammatically a system embodying my invention on a boiler. Referring to the figure, I have shown a boiler 1. Make-up water or feedwater is supplied by line 2 and steam is withdrawn through pipe 3. A sample may be withdrawn through sample line 4. The sample is carried to heat exchanger 5 in which it is cooled. The cooled sample is carried to vessel 6 in which is placed a conductivity cell 7. The sample is removed from vessel 6 to neutralizing chamber 8 where $CO_2$ gas is introduced through line 9 from $CO_2$ tank 10 to neutralize the hydroxide (OH—) to bicarbonate ($HCO_3$—). The neutralized sample is then removed to vessel 11 in which is placed a conductivity cell 12. The conductivity cells 7 and 12 are connected to conductivty bridges of usual design and the conductivity of the liquids at each point measured in usual fashion and recorded on a two pen recorder. The difference in conductivity or differential conductivity bears a direct relationship to the concentration of hydroxide as shown in FIG. 2. This can be determined from a graph such as FIG. 2. Alternatively, the signals from the two conductivity bridges can be used to energize a signal system which produces a signal corresponding to differential conductivity which can in turn be used to regulate the addition of alkaline chemicals used for internal conditioning of boiler water. The specific chemistry and mechanism for carrying out this chemical feed operation are disclosed in Kaufman et al. Pat. 2,964,024 and will not be repeated here.

An alternate practice of the invention using a single conductivity cell might be employed, and may be necessary in certain applications. In such practice, the following sequence of operation may be used: (1) fill conductivity cell with sample; (2) measure $C_1$, the initial conductivity; (3) record and/or "remember" $C_1$; (4) introduce $CO_2$ as required for complete neutralization of reactable materials; (5) measure $C_2$, the final conductivity; (6) record and/or "remember" $C_2$; (7) compute $C_1-C_2$, the differential conductivity; (8) record $C_1-C_2$ and/or generate a related control signal; (9) dump sample to make way for next cycle.

The differential conductivity was determined for five typical boiler water samples to determine the consistency on different waters. The test results are shown in Table I. It should be noted that the change in conductivity for each p.p.m. of sodium hydroxide is quite consistent.

TABLE I.—CHANGE IN CONDUCTIVITY OF BOILER WATER SAMPLES NEUTRALIZED WITH CARBON DIOXIDE

| Sample No. | Measured hydroxide Alkalinity[1] p.p.m. NaOH | Conductivity of sample (micromhos/cm.) | | Change in conductivity, micromhos/cm. | Change in conductivity per p.p.m. NaOH |
| | | Before $CO_2$ neutralization | After $CO_2$ neutralization | | |
| --- | --- | --- | --- | --- | --- |
| 1 | 217 | 1,782 | 1,030 | 752 | 3.47 |
| 2 | 220 | 1,942 | 1,168 | 774 | 3.52 |
| 3 | 253 | 4,460 | 3,480 | 980 | 3.87 |
| 4 | 479 | 7,740 | 6,120 | 1,620 | 3.38 |
| 5 | 256 | 1,994 | 1,156 | 838 | 3.27 |

[1] As determined by conventional titration with standard acid to the phenolphthalein endpoint in an excess of $BaCl_2$.

EXAMPLE II

The invention may be used to measure and control the excess hydroxide in effluent from chemical softeners such as lime-soda softeners. The technique is precisely the same as discussed in connection with the analysis of boiler water set out in Example I. The change in conductivity of a series of lime-soda softened waters on neutralization with $CO_2$ is set out in Table II and illustrated in FIG. 2.

TABLE II.—CHANGE IN CONDUCTIVITY OF LIME-SODA SOFTENED WATERS ON NEUTRALIZATION WITH CARBON DIOXIDE

| Sample Number | Conductivity (micromhos/cm.) | | | Alkalinity readings (epm.) | | | |
| | Initial | Final | Decrease | P[a] | M[b] | "2P-M"[c] | "OH"[d] |
| --- | --- | --- | --- | --- | --- | --- | --- |
| 1 | 551 | 476 | 75 | 0.78 | 1.31 | 0.25 | 0.25 |
| 2 | 584 | 484 | 100 | 0.97 | 1.51 | 0.43 | 0.40 |
| 3 | 622 | 499 | 123 | 1.12 | 1.68 | 0.56 | 0.54 |
| 4 | 653 | 510 | 143 | 1.30 | 1.86 | 0.74 | 0.70 |

[a] "P alkalinity" as determined by conventional titration with standard acid to the phenolphthalein endpoint.
[b] "M alkalinity" as determined by conventional titration with standard acid to the methyl red or methyl orange endpoint.
[c] The "2 P-M" or "Lime control" value is customarily used as an indication of needed changes in p.p.m. lime feed rate.
[d] "OH" or "Hydroxide alkalinity", another common index of the appropriateness of the lime feed rate, as determined by conventional titration with standard acid to the phenolphthalein endpoint in an excess of $BaCl_2$.

TABLE III.—CHANGE IN CONDUCTIVITY OF SULFATE DIGESTER LIQUOR ON NEUTRALIZATION WITH CARBON DIOXIDE

| Sampling Point | Conductivity (micromhos/cm.) | | | Active Alkali (lb./ft.³) |
| | Initial | Final | Decrease | |
| --- | --- | --- | --- | --- |
| Upper injection | 114,500 | 68,700 | 45,800 | 1.52 |
| Lower injection | 126,000 | 70,450 | 55,550 | 1.76 |
| Bottom strainer | 132,000 | 73,050 | 58,950 | 1.84 |

EXAMPLE III

The concentration of active alkali in sulfate digester liquid for paper pulp processing was analyzed by the same method described in Example I. That is to say, conductivity of the raw liquor was measured, the liquor neutralized with $CO_2$, the neutralized liquor conductivity measured and a resultant differential conductivity determined. The resulting data appear in Table III and FIG. 3, showing neutralized differential conductivity versus concentration of active alkali.

EXAMPLE IV

Many chemical process liquors contain various amounts of strong acids whose concentrations must be measured for control purposes. Such measurements can be effected quite easily from electrical conductivity data obtained before and after neutralization with a self-buffering alkaline reagent. Table IV and FIG. 4 illustrate the manner in which a substantially stable conductimetric endpoint is attained in the neutralization of sulfuric acid with ammonia. Table V and FIG. 5 show the relationship between sufuric acid concentrations and differences in conductivity before and after neutralization with a large and arbitrary excess of ammonia. The conductimetric endpoint characteristics of hydrazine, cyclohexylamine and morpholine in neutralization of sulfuric acid are exhibited, respectively in Table VI (FIG. 6), Table VII (FIG. 7) and Table VIII (FIG. 8).

TABLE IV.—NEUTRALIZATION OF 0.96% $H_2SO_4$ SOLUTION WITH AMMONIA

| Mg. $NH_3$ added | pH | Conductivity, $\mu$mhos |
| --- | --- | --- |
| 0 | 0.9 | 44,400 |
| 50 | | 37,880 |
| 101 | 1.1 | 32,330 |
| 151 | | 28,570 |
| 202 | | 25,000 |
| 252 | 1.7 | 22,268 |
| 302 | | 20,250 |
| 352 | 8.0 | 19,620 |
| 504 | | 19,550 |
| 756 | | 19,510 |
| 1,008 | 9.5 | 19,450 |
| 2,268 | 10.0 | 19,350 |

TABLE V.—DECREASE IN CONDUCTIVITY OF VARIOUS SULFURIC ACID SOLUTIONS ON NEUTRALIZATION WITH AMMONIA

| | Conductivity, micromhos/cm. | | |
| --- | --- | --- | --- |
| $H_2SO_4$, percent | Initial | Final | Decrease |
| 0.96 | 44,400 | 19,550 | 24,850 |
| 0.72 | 35,400 | 15,014 | 20,386 |
| 0.48 | 24,400 | 10,588 | 13,812 |
| 0.24 | 13,640 | 5,750 | 7,890 |
| 0.12 | 7,320 | 3,160 | 3,940 |

TABLE VI.—NEUTRALIZATION OF 100 ml. OF 0.48% $H_2SO_4$ SOLUTION WITH HYDRAZINE

| Mg. $N_2H_4$ added | pH | Conductivity, $\mu$mhos |
| --- | --- | --- |
| 0 | 1.3 | 23,600 |
| 55.8 | 1.4 | 19,220 |
| 111.6 | 1.6 | 15,850 |
| 223.2 | 2.0 | 10,940 |
| 334.8 | 7.3 | 8,800 |
| 390.6 | | 8,800 |
| 558 | 8.1 | 8,800 |
| 3,348 | 9.2 | 8,820 |

TABLE VII.—NEUTRALIZATION OF 100 ml. OF 0.48% $H_2SO_4$ SOLUTION WITH CYCLOHEXYLAMINE

| Mg. cyclohexylamine added | pH | Conductivity, $\mu$mhos |
| --- | --- | --- |
| 0 | 1.30 | 24,400 |
| 0.1 | 1.60 | 22,150 |
| 0.4 | 1.78 + | 15,820 |
| 1.0 | 2.90 | 8,280 |
| 1.2 | 9.41 + | 7,500 |
| 2.0 | 10.41 | 7,240 |
| 5.0 | 11.18 | 7,240 |

TABLE VIII.—NEUTRALIZATION OF 100 ml. OF 0.48% $H_2SO_4$ SOLUTION WITH MORPHOLINE

| Ml. morpholine added | pH | Conductivity, $\mu$mhos |
| --- | --- | --- |
| 0 | 1.22 | 24,200 |
| 0.1 | 1.30 | 21,600 |
| 0.3 | 1.45 | 16,600 |
| 0.5 | 1.70 | 12,420 |
| 0.7 | 2.11 | 9,310 |
| 0.9 | 7.40 | 7,490 |
| 1.0 | 8.73 | 7,510 |

In the foregoing examples, I have attempted to show certain common problem areas where the method of my invention is of particular usefulness. Many similar areas may be handled in like manner using an appropriate self-buffering reagent such as the weak acids (e.g. acetic acid, boric acid, citric acid, salicilic acid, carbonic acid), or certain salts of such weak acids in the case of alkaline systems or weak alkalis (e.g. ammonia, ammonium hydroxide, hydrazine, cyclohexylamine, morpholine) in the case of acid systems. Different materials in a single system may be measured by using a self-buffering reagent capable of buffering to a selected pH critical to the particular material.

While I have illustrated and described certain present typical practices and embodiments of my invention, it will be understood that this invention may be otherwise embodied within the scope of the following claims.

I claim:

1. The method of determining the amount of ionized constituents in solution comprising the steps of measuring the conductivity of said solution, adding a reaction reagent of the type that can be added in substantial excess beyond the point of neutralization without significantly further affecting the conductivity of the solution and capable of reacting with said constituent in an amount in excess of that necessary for reaction, measuring the conductivity of the solution following the addition of reagent, measuring the difference between the two conductivities and determining the amount of constituent present from a curve of differential conductivity versus concentration prepared from known concentrations of the same constituent reacted with the same reagent.

2. The method as claimed in claim 1 including withdrawing a sample from the mass of solution, measuring the conductivity of said sample, adding the reaction agent to said sample, measuring the conductivity of the sample following addition of the reaction agent, determining the difference between the two conductivities and determining the amount of constituent present.

3. The method as claimed in claim 1 including withdrawing two samples from the mass of solution, measuring the conductivity of one sample, adding the reaction agent to the other sample, measuring the conductivity of said other sample following addition of the reaction agent, determining the difference between the two conductivities and determining the amount of constituent present.

4. The method as claimed in claim 1 wherein the constituent is sodium hydroxide and the reaction reagent is carbon dioxide.

5. The method as claimed in claim 1 wherein the constituent is a metal hydroxide and the reaction reagent is a member from the group consisting of carbonic acid, acetic acid, boric acid, citric acid, and salicilic acid.

6. The method as claimed in claim 1 wherein the constituent is an inorganic acid and the reaction reagent is a member from the group consisting of ammonia, ammonium hydroxide, hydrazine, morpholine, cyclohexylamine, and triethanolamine.

References Cited

UNITED STATES PATENTS 2,964,024  12/1960  Kaufman et al. _____ 122—382
2,559,090   7/1951  Potter _____ 137—93

OTHER REFERENCES

Potter, E. C., Electrochemistry Principles and Applications, London, Cleaver-Hume Press Ltd., 1956, pp. 185 to 187 relied on.

MORRIS O. WOLK, Primary Examiner

R. M. REESE, Assistant Examiner

U.S. Cl. X.R.

23—253; 122—379; 137—5, 93; 324—30

UNITED STATES PATENT OFFICE
CERTIFICATE OF CORRECTION

Patent No. 3,531,252                                        September 29, 1970

Hubert M. Rivers

It is certified that error appears in the above identified patent and that said Letters Patent are hereby corrected as shown below:

Column 1, line 39, after "boilers" insert a comma. Column 2, line 56, "conductivty" should read -- conductivity --. Column 5, Table VII, under the sub-heading "pH', after "1.78" cancel the "+"; same Table VII, under the sub-heading "pH", after "9.41" cancel the "+".

Signed and sealed this 6th day of April 1971.

(SEAL)
Attest:

EDWARD M. FLETCHER, JR.                       WILLIAM E. SCHUYLER, JR.
Attesting Officer                               Commissioner of Patents